United States Patent [19]

Akiyama

[11] Patent Number: 4,901,258

[45] Date of Patent: Feb. 13, 1990

[54] METHOD OF AND APPARATUS FOR GENERATING LOOK-UP TABLE DATA

[75] Inventor: Kazuya Akiyama, Kyoto, Japan

[73] Assignee: Dainippon Screen Mfg. Co., Ltd., Kyoto, Japan

[21] Appl. No.: 137,144

[22] Filed: Dec. 23, 1987

[30] Foreign Application Priority Data

Dec. 23, 1986 [JP] Japan .................................. 61-315186

[51] Int. Cl.$^4$ .................... G06F 15/353; G06F 15/66; G11C 7/00

[52] U.S. Cl. ..................................... 364/577; 358/80; 364/521; 364/571.07

[58] Field of Search .............. 364/577, 571.08, 571.04, 364/571.07, 521; 358/80

[56] References Cited

U.S. PATENT DOCUMENTS

| | | | |
|---|---|---|---|
| 4,231,097 | 10/1980 | Shibayama et al. ................. | 364/577 |
| 4,275,413 | 6/1981 | Sakamoto et al. .................... | 358/80 |
| 4,446,529 | 5/1984 | Strolle ................................. | 364/577 |
| 4,462,083 | 7/1984 | Schwefel ............................. | 364/577 |
| 4,534,059 | 8/1985 | Yamada . | |
| 4,712,141 | 12/1987 | Tomohisa et al. ..................... | 358/80 |
| 4,725,892 | 2/1988 | Suzuki et al. ........................ | 364/577 |
| 4,792,847 | 12/1988 | Shimazaki et al. ................... | 358/80 |

FOREIGN PATENT DOCUMENTS 0049657 3/1984 Japan .............................. 364/511.07

OTHER PUBLICATIONS

Jean-Paul Tremblaz & Richard B. Bunt "An Introduction to Computer Science An Algorithmic Approach", 1979, pp. 430–440.

Primary Examiner—Felix D. Gruber
Attorney, Agent, or Firm—Lowe, Price, Leblanc, Becker & Shur

[57] ABSTRACT

Basic data obtained by thinning-out data to be written in a look-up table are previously operated by a computer and stored in a basic memory table. Coefficient data required for linearly interpolating the basic data are stored in a coefficient memory table. The basic data and the coefficient data are read in accordance with address designation by an address generator while being related with each other and subjected to interpolation operation by an interpolation computing element, and data thus obtained are sequentially written in the look-up table.

18 Claims, 5 Drawing Sheets

| ADDRESS | DATA |
|---|---|
| 0 | D(0) |
| 1 | D(4) |
| 2 | D(4) |
| 3 | D(8) |
| 4 | D(8) |
| 5 | D(12) |
| 6 | D(12) |
| 7 | D(16) |

| ADDRESS | DATA |
|---|---|
| 0 | 4/4 |
| 1 | 0/4 |
| 2 | 3/4 |
| 3 | 1/4 |
| 4 | 2/4 |
| 5 | 2/4 |
| 6 | 1/4 |
| 7 | 3/4 |

METHOD OF AND APPARATUS FOR GENERATING LOOK-UP TABLE DATA

BACKGROUND OF THE INVENTION

1. Field of the Invention

The present invention relates to a method of and an apparatus for efficiently generating in a short time data to be written in a look-up table.

2. Description of the Prior Art

In a conventional electronic process scanner, for example, states of an output image such as color tones, contrast etc. set in a certain image processing condition can be confirmed by an operator on a color monitor in advance to actual scanning. When a look-up table is employed for a color operating part of such an electronic process scanner, the look-up table previously stores results obtained by performing color compensation operation on all input image data in accordance with prescribed color compensation calculating expressions. Color-compensated image data are immediately read out by the look-up table without performing a color compensation operation one by one on input image data obtained by input scanning, to be displayed on the color monitor. The look-up table may be formed for discrete input image data, so that data read from the look-up table are interpolated to obtain results of the color compensation operations with respect to all input image data. Since constants in the color compensation calculating expressions are varied with image processing conditions, the operation must be done over again to update look-up table data when the operator changes the image processing condition. However, since calculating expressions for color compensation are extremely complicated, a long time, e.g., about several seconds, has been required for such updating. Thus, the operator must accept a waiting time of several seconds until display on the color monitor is changed every time he sets an image processing condition in order to attain a desired output image by suitably changing the image processing condition while observing the states of an output image on the color monitor, and hence a considerably long time has been required to finally obtain the desired image by repeating such operations.

SUMMARY OF THE INVENTION

The present invention is directed to a method of and an apparatus for efficiently generating in a short time data to be written in a look-up table.

According to the present invention, basic data obtained by thinning-out data to be written in a look-up table at regular intervals are previously operated and stored while coefficient data required for linearly interpolating the basic data are also previously stored to perform interpolation operation in an interpolation computing element by relationally reading the basic data and the coefficient data, thereby to sequentially write data thus obtained in the look-up table.

Namely, according to the present invention, look-up table data obtained by an operation performed in accordance with color compensation calculating expressions are only basic data and remaining look-up table data are generated by linear interpolation by an interpolation computing element, thereby to reduce the time for generating the look-up table data as a whole.

Accordingly, an object of the present invention is to overcome the aforementioned disadvantages of the prior art and to provide a method of and an apparatus for generating look-up table data, which can efficiently generate in a short time data to be written in a look-up table with simple structure, and which can change states of an output image displayed on a color monitor of an electronic process scanner, for example, substantially in real time even if an operator changes an image processing condition.

These and other objects, features, aspects and advantages of the present invention will become more apparent from the following detailed description of the present invention when taken in conjunction with the accompanying drawings.

DESCRIPTION OF THE PREFERRED EMBODIMENTS

(A) First Embodiment

Figures 1, 2, 3:
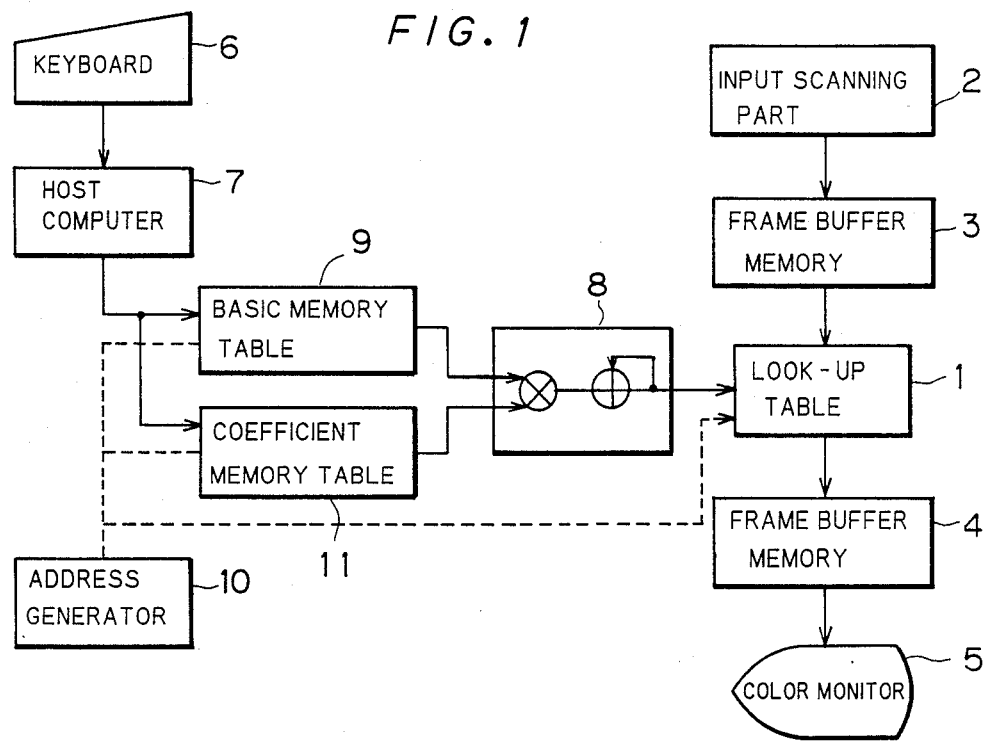
FIG. 1 is a block diagram showing an embodiment of the present invention.
FIG. 2 is illustrative of address assignment of basic data.
FIG. 3 is illustrative of address assignment of coefficient data.

FIG. 1 is a block diagram schematically showing the structure of an embodiment of the present invention. Referring to FIG. 1, a look-up table 1 stores results obtained by performing an operation for color compensation on all input image data in accordance with prescribed color compensation calculating expressions. An input scanning part 2 of, e.g., a process scanner to which the present invention is applied photoelectrically scans an original (not shown) to obtain color-separated input image data responsive to the variable color density of the original. The input image data are temporarily stored in a frame buffer memory 3 of an input area, and sequentially read out to be immediately converted into color-compensated image data by the look-up table 1 without being subjected to color compensation calculation, and again temporarily stored in a frame buffer memory 4 of an output area.

In setting of an image processing condition, the color-compensated image data temporarily stored in the frame buffer memory 4 are displayed on a color monitor 5 as a simulation of a printed image that may result from the data, whereby an operator can confirm whether or not a desired output image is obtained by the image processing condition set by him. After the desired image processing condition is completely set, the contents of the frame buffer memory 4 are supplied to an output scanning part (not shown), so that exposure scanning for obtaining a plate for each separation color is performed on a photosensitive material such as a film.

The image processing condition is set through a keyboard 6. Upon such setting, in a conventional system, a host computer 7 operates on all data to be stored in the look-up table 1 by performing calculations in accordance with prescribed color compensation expressions to store the data in the look-up table 1, so that a long time was required for such operation, as hereinabove described. In order to reduce the time for generating such look-up table data, the host computer 7 in the present invention is adapted to operate, in accordance with color compensation calculating expressions in practice, only on basic data obtained by performing calculations in accordance with thinning-out the look-up table data at prescribed intervals, and the remaining look-up table data are generated through linear interpolation by a multiplier/accumulator 8 which performs interpolation operation.

On the assumption that the look-up table 1 is a one-dimensional table of four-bit addresses, description is now made on a procedure up to actual data writing in the look-up table 1.

(1) First, the operator sets an image processing condition through the keyboard 6.

(2) The host computer 7 operates on basic data by color compensation calculating expressions responsive to the set image processing condition. The total of the look-up table data is $2^4 = 16$ (denoted by D(0) to D(15)), and D(0), D(4), D(8), D(12) and D(16) are operated on as the basic data. The data D(16) is added because the same is required, in addition to D(12), for obtaining D(13) to D(15) through interpolation calculation.

(3) The basic data thus obtained are written in a basic memory table 9 in a doubled manner, as shown in a memory map of FIG. 2. Such doubled address assignment is adapted to facilitate address generation by an address generator 10, as hereinafter described.

(4) Coefficients required for the interpolation calculation are previously written in a coefficient memory table 11 in sequence required for the calculation, as shown in a memory map of FIG. 3. Since these coefficients are not changed, the coefficient memory table 11 may be prepared in a RAM, in which the coefficients are written only once at the start of the operation, or in a ROM previously written with the same data.

Figure 4:
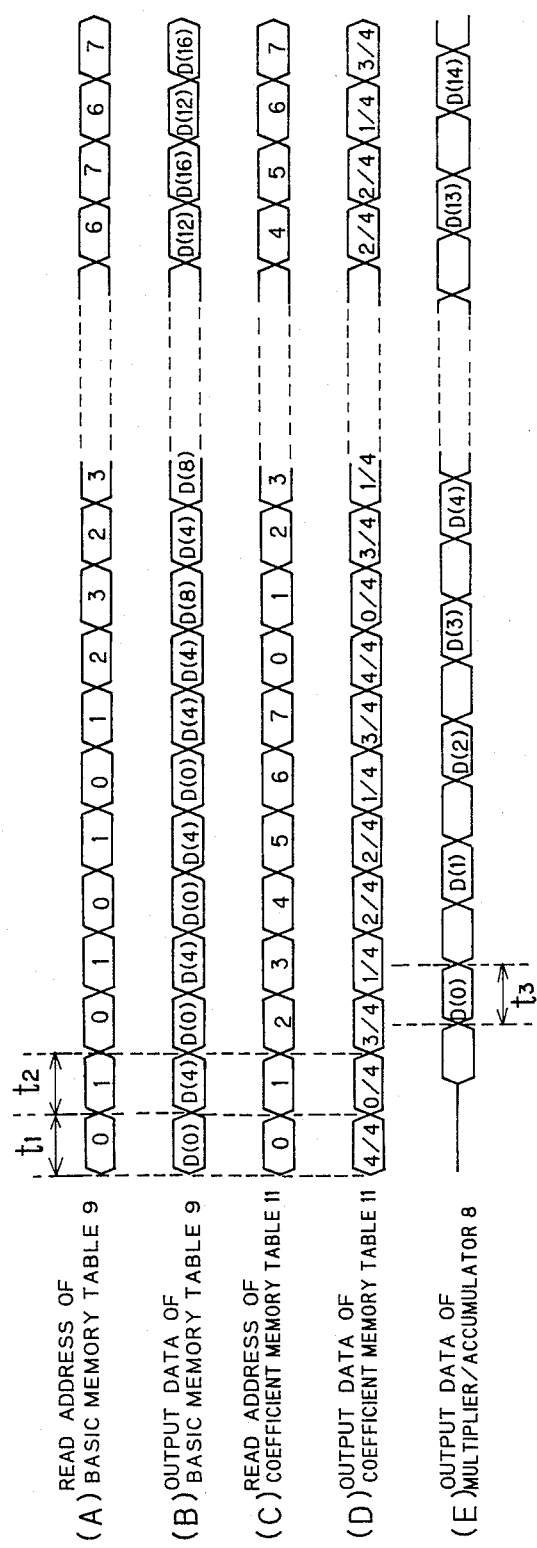
FIG. 4 is a timing chart showing the operation of the embodiment shown in FIG. 1.

(5) The basic and coefficient data are sequentially read from the basic and coefficient memory tables 9 and 11 in accordance with addresses generated by the address generator 10 respectively as shown in FIG. 4, to perform an interpolation 8 operation by the multiplier/accumulator 8. Interpolation operation expressions for obtaining all of the look-up table data D(0) to D(15) from five basic data D(0), D(4), D(8), D(12) and D(16) are as follows:

$$D(0) = D(0) \times 4/4 + D(4) \times 0/4 \quad (1a)$$

$$D(1) = D(0) \times 3/4 + D(4) \times 1/4 \quad (1b)$$

$$D(2) = D(0) \times 2/4 + D(4) \times 2/4 \quad (1c)$$

$$D(3) = D(0) \times 1/4 + D(4) \times 3/4 \quad (1d)$$

$$D(4) = D(4) \times 4/4 + D(8) \times 0/4 \quad (1e)$$

$$D(5) = D(4) \times 3/4 + D(8) \times 1/4 \quad (1f)$$

$$\ldots \quad \ldots \quad \ldots$$

$$D(15) = D(12) \times 1/4 + D(16) \times 3/4 \quad (1p)$$

Figure 5:
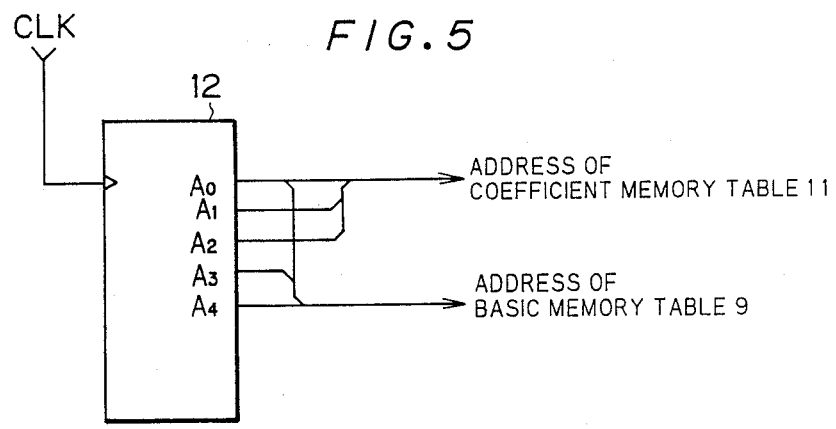
FIG. 5 illustrates an exemplary address generator.

For example, first and second terms of the above expression (1a) are calculated at times $t_1$ and $t_2$ of FIG. 4 respectively, so that the result of accumulation thereof is outputted as the data D(0) from the multiplier/accumulator 8 at a time $t_3$. Output of the data D(0) is retarded by a delay through the multiplier/accumulator 8. Data under operation (results of operation of respective first terms of the expressions (1a) to (1p) in this case) are outputted in null output parts of the multiplier/accumulator 8 in FIG. 4. In this embodiment, read addresses of the basic and coefficient memory tables 9 and 11 can be readily obtained by employing or appropriately combining respective outputs $A_0$ to $A_4$ ($A_0$: least significant digital bit) of a binary counter 12 shown in FIG. 5.

(6) The look-up table data D(0), D(1), . . . , D(15) generated in the above manner are sequentially written in the look-up table 1 in accordance with the addresses generated by the address generator 10, to complete updating of the look-up table data along the setting of the image processing condition described in the item (1). Processing timing will be described in detail with reference to another embodiment shown in FIG. 6.

(B) Second Embodiment

Figure 6:
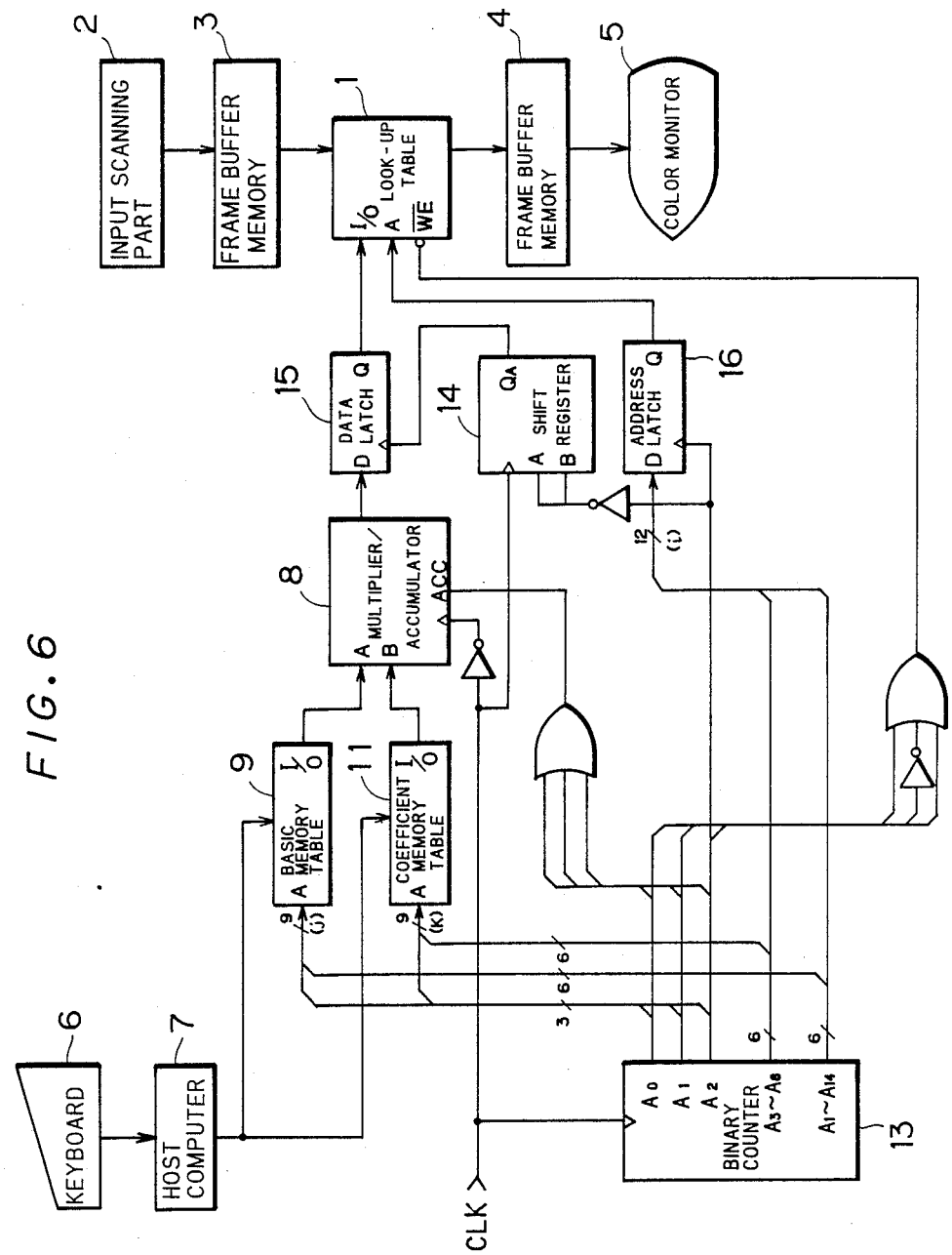
FIG. 6 is a block diagram showing another embodiment of the present invention.

FIG. 6 is a block diagram showing a second embodiment of the present invention. With reference to this embodiment, description is made on a method of obtaining data of a look-up table 1 having a three-dimensional address space with four-bit addresses per dimension from basic data thinned-out to two-bit addresses per dimension through interpolation.

Figure 7:
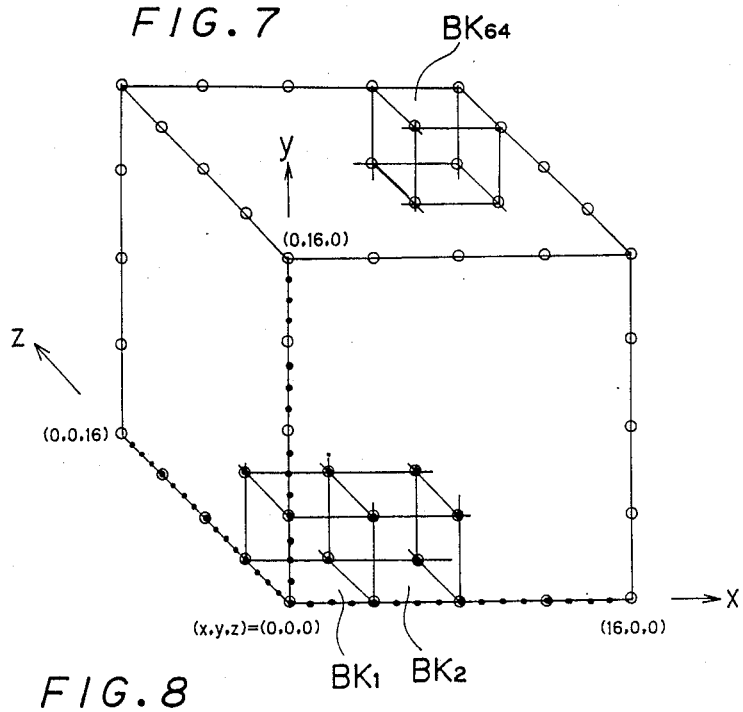
FIG. 7 is a conceptual diagram showing a look-up table having a three-dimensional address space.

The look-up table 1 is a three-dimensional table having $2^4 = 16$ addresses per dimension, and hence the same can be conceptually recognized in the form of a cube shown in FIG. 7. Assuming that x, y and z (integers of 0 to 15) represent addresses of respective dimensions, any address i of the look-up table 1 can be generally expressed as follows:

$$i = x \times 2^0 + y \times 2^4 + z \times 2^8 \quad (2)$$

Assuming that L(i) represents data addressed by the i, data L(i) of sixteen per dimension, i.e., $16^3 = 4096$ in total (i: integers of 0 to 4095) are arranged in the form of a lattice as shown by black points in FIG. 7, to form the look-up table 1.

In order to obtain the data L(i) through interpolation, basic data of five per dimension, i.e., 125 data in total, are arranged as shown by white circles in FIG. 7. Arbitrary data L(i) is obtained by interpolating eight basic data enclosing the same in FIG. 7. Namely, the cube shown in FIG. 7 is divided into 64 blocks $BK_1$ to $BK_{64}$, each of which is formed by a cube enclosed by eight basic data, and each block is interpolated to $4^3 = 64$ data, thereby to obtain $64 \times 64 = 4096$ data in total.

Figure 8:
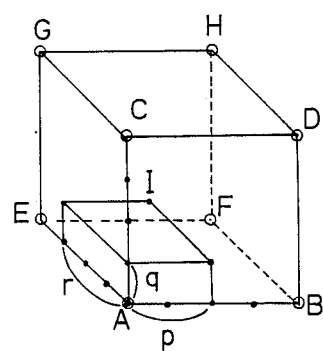
FIG. 8 is a conceptual diagram showing a block formed by a set of basic data.

Referring to FIG. 8 showing a block including the data L(i) to be obtained, the data L(i) in a position I is obtained from eight basic data B(A) to B(H) in positions A to H and distances p, q and r (integers of 0 to 3) in directions x, y and z between points I and A, along the following expression:

$$L(i) = B(A) \times (4-p) \times (4-q) \times (4-r) \times 1/64 + \quad (3)$$
$$B(B) \times p \times (4-q) \times (4-r) \times 1/64 +$$
$$B(C) \times (4j-p) \times q \times (4-r) \times 1/64 +$$
$$B(D) \times p \times q \times (4-r) \times 1/64 +$$
$$B(E) \times (4-p) \times (4-q) \times r \times 1/64 +$$
$$B(F) \times p \times (4-q) \times r \times 1/64 +$$
$$B(G) \times (4-p) \times q \times r \times 1/64 +$$
$$B(H) \times p \times q \times r \times 1/64$$
$$= B(A) \times C(A) + B \times (B) \times C(B) +$$
$$B(C) \times C(C) + B(D) \times C(D) + B(E) \times C(E) +$$
$$B(F) \times C(F) + B(G) \times C(G) + B(H) \times C(H)$$

Within the expression (3), B(A) to B(H) are eight data in 125 basic data, which are decided when the block to which L(i) belongs is recognized. Further, eight coefficient data C(A) to C(H) are decided when the position of L(i) in the block is recognized, and are common to all blocks.

It is simpler to obtain interpolation data block by block by executing interpolation operation of the expression (3) for each of blocks $BK_1$ to $BK_{64}$ than obtaining the same by executing interpolation operation from L(0) to L(4095) along sequence of the addresses in the look-up table. Therefore, the following description is made with respect to a method of most efficiently packing the basic and coefficient data (method of data address assignment in a redundant manner) in case of obtaining interpolation data block by block and a method of generating read addresses of the basic and coefficient memory tables 9 and 11 for interpolation and write addresses of the look-up table 1.

(B-1) Packing Method for Basic Data

Eight basic data for each block are treated as a set of basic data. The 125 basic data are redundantly packed as $8 \times 64 = 512$ data in total because there are 64 blocks (sets), and different addresses are assigned respectively to store the same in a basic memory table 9. Assuming that, in general, $(B(x_1, y_1, z_1)$ represents basic data being in position $(x, y, z) = (x_1, y_1, z_1)$ and B(j) represents data having address j (j: integers of 0 to 511) in the basic memory table, the basic data are packed as follows:

$$B(8n) = B(4R_4(n), 4(Q_4(n) - 4Q_{16}(n)), 4Q_{16}(n)) \quad (4a)$$

$$B(8n+1) = B(4R_4(n)+4, 4(Q_4(n) - Q_{16}(n)), 4Q_{16}(n)) \quad (4b)$$

$$B(8n+2) = B(4R_4(n), 4Q_4(n) - 4Q_{16}(n)) + 4, 4Q_{16}(n)) \quad (4c)$$

$$B(8n+3) = B(4R_4(n)+4, 4(Q_4(n) - 4Q_{16}(n))+4, 4Q_{16}(n)) \quad (4d)$$

$$B(8n+4) = B(4R_4(n), 4(Q_4(n) - 4Q_{16}(n)), 4Q_{16}(n)+4) \quad (4e)$$

$$B(8n+5) = B(4R_4(n)+4, 4(Q_4(n) - 4Q_{16}(n)), 4Q_{16}(n)+4) \quad (4f)$$

$$B(8n+6) = B(4R_4(n), 4(Q_4(n) - 4Q_{16}(n))+4, 4Q_{16}(n)+4) \quad (4g)$$

$$B(8n+7) = B(4R_4(n)+4, 4(Q_4(n) - 4Q_{16}(n))+4, 4Q_{16}(n)+4) \quad (4h)$$

In the above expressions, n (n: integers of 0 to 63) represents block numbers, $Q_4(n)$ represents quotients obtained by dividing n by 4 and $R_4(n)$ represents remainders. Briefly stated, eight data forming each of 64 blocks $BK_1$, $BK_2$, ..., $BK_{64}$ in FIG. 7 are arranged in sequence of A to H in FIG. 8 and along the sequence of block numbers to be stored in the basic memory table 9 under assignment of different addresses of 0 to 511.

(B-2) Packing Method for Coefficient Data

Eight coefficient data of C(A) to C(H) for each L(i) represented by the expression (3) are treated as a set of coefficient data. The coefficient data of $8 \times 4^3 = 512$ belongs to each block because there are $4^3$ of L(i) in one block. Since these are common to respective blocks, the coefficient data are packed as 512 data in total to be written in the coefficient memory table 11 under assignment of different addresses in sequence required for calculation. When, in general, the point A is in a position of $(x, y, z) = (x_1, y_1, z_1)$ in FIG. 8, the point I is in a position of $(x, y, z) = (x_1+p, y_1+q, z_1+r)$ (p, q, r: integers of 0 to 3). Assuming that C(k) represents data of address k (k: integers of 0 to 511) in the coefficient memory table 11, the coefficient data are packed as follows:

$$C(8p+32q+128r) = (4-p) \times (4-q) \times (4-r) \times 1/64 \quad (5a)$$

$$C(8p+32q+128r+1) = p \times (4-q) \times (4-r) \times 1/64 \quad (5b)$$

$$C(8p+32q+128r+2) = (4-p) \times q \times (4-r) \times 1/64 \quad (5c)$$

$$C(8p+32q+128r+3) = p \times q \times (4-r) \times 1/64 \quad (5d)$$

$$C(8p+32q+128r+4) = (4-p) \times (4-q) \times r \times 1/64 \quad (5e)$$

$$C(8p+32q+128r+5) = p \times (4-q) \times r \times 1/64 \quad (5f)$$

$$C(8p+32q+128r+6) = (4-p) \times q \times r \times 1/64 \quad (5g)$$

$$C(8p+32q+128r+7) = p \times q \times r \times 1/64 \quad (5h)$$

(B-3) Address Generation Method

Figure 9:
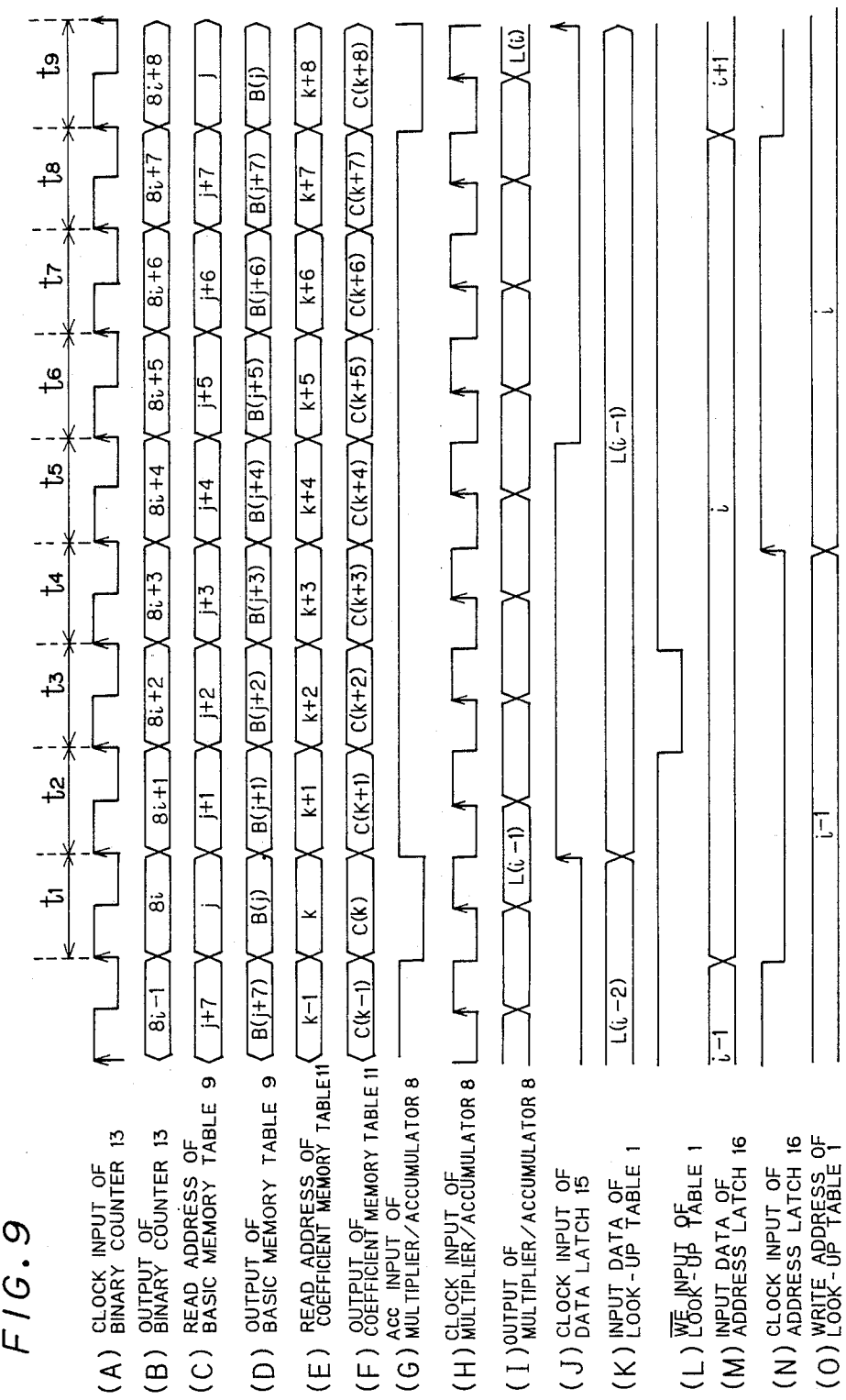
FIG. 9 is a timing chart showing the operation of the embodiment shown in FIG. 6.

Description is now made on a method of generating read addresses of the basic and coefficient memory tables 9 and 11 and write addresses of the look-up table 1 for performing interpolation in timing as shown in FIG. 9 under storage of the basic and coefficient data in the basic and coefficient memory tables 9 and 11 of FIG. 6 by the aforementioned packing method. In this embodiment, a 15-bit binary counter 13 is employed as an address generator.

Assuming that i and L(i) represent the write addresses of the look-up table 1 and the data thereof respectively, j and B(j) represent the read addresses of the basic memory table 9 and the basic data thereof and k and C(k) represent the read addresses of the coefficient memory table 11 and the coefficient data thereof respectively, the above expression (3) is expressed as follows:

$$L(i) = B(j) \times C \times (k) + B(j+1) \times c(k+1) + \quad (6)$$
$$B(j+2) \times C(k+2) + B(j+3) \times C(k+3) +$$
$$B(j+4) \times C(k+4) + B(j+5) \times C(k+5) +$$
$$B(J+6) \times C(k+6) + B(j+7) \times C(k+7)$$

The respective terms of the above expression (6) are operated in a multiplier/accumulator 8 at time $t_1$ to $t_8$ in FIG. 9 respectively, and the result of accumulation thereof is outputted as the data L(i) from the multiplier/accumulator 8 at a time $t_9$ immediately after the time $t_8$, as shown at FIG. 9(I). As shown at FIG. 9(H), the multiplier/accumulator 8 performs multiplying/accumulating operation in synchronization with clock signals obtained by inverting clock signals from the binary counter 13 at FIG. 9(A), and its ACC input receives a control signal which goes low for each operation of single look-up table data L(i) as shown at FIG. 9(G), so that the content of accumulation is cleared each time. The multiplier/accumulator 8 may be prepared by TMC2210 by TRW Inc., for example.

In the embodiment shown in FIG. 6, relation between outputs $A_0$ to $A_{14}$ ($A_0$: least significant digit bit) and the write addresses i of the look-up table 1 as well as the read addresses j and k of the basic and coefficient memory tables 9 and 11 is as follows:

$$i = A_{14} \times 2^{11} + A_{13} \times 2^{10} + A_{10} \times 2^9 + A_9 \times 2^8 + \\ A_6 \times 2^7 + A_5 \times 2^6 + A_{12} \times 2^5 + A_{11} \times 2^4 + \\ A_8 \times 2^3 + A_7 \times 2^2 + A_4 \times 2^1 + A_3 \times 2^0 \tag{7a}$$

$$j = A_{14} \times 2^8 + A_{13} \times 2^7 + A_{12} \times 2^6 + A_{11} \times 2^5 + \\ A_{10} \times 2^4 + A_9 \times 2^3 + A_2 \times 2^2 + A_1 \times 2^1 + \\ A_0 \times 2^0 \tag{7b}$$

$$k = A_8 \times 2^8 + A_7 \times 2^7 + A_6 \times 2^6 + A_5 \times 2^5 + \\ A_4 \times 2^4 + A_3 \times 2^3 + A_2 \times 2^2 + A_1 \times 2^1 + \\ A_0 \times 2^0 \tag{7c}$$

Generation of the read addresses is thus simplified by packing the basic and coefficient data by the aforementioned packing method to assign the addresses.

Referring to FIG. 6, a shift regulator 14 derives data latch clocks of FIG. 9(J) by inverting output $A_2$ of the binary counter 13 and shifting the same by one clock, and a data latch 15 latches the look-up table data L(i) outputted from the multiplier/accumulator 8 in synchronization with the data latch clocks, as shown at FIG. 9(K). An address latch 16 is a latch for latching the write addresses of the look-up table 1 outputted from the binary counter 13 in order to attain synchronization with the look-up table data outputted from the data latch 15, by receiving the output $A_2$ of the binary counter 13 as clock input as shown at FIG. 9(N) to latch the address data i of FIG. 9(M) in synchronization with the same. Thus, the look-up table 1 is supplied with the look-up table data of FIG. 9(K) and the address data of FIG. 9(O) in synchronization, to perform data storage in response to fall of a write control signal WE shown at FIG. 9(L).

(C) Extension of Data Packing Method

The aforementioned data packing method is generally applicable to a look-up table 1 having a b-dimensional address space formed by a bits per dimension and a basic memory table 9 having a b-dimensional address space formed by c bits per dimension, where a, b and c represent natural numbers of $1 \leq c < a$.

In this case, the number of basic data is $2^c + 1$ per dimension, and $(2^c + 1)^b$ in total in b dimensions. A set of basic data are formed by $2^b$ basic data which mutually adjoin in each dimension. The basic data are packed as $2^b \times (2^c)^b$ data in total because there are $(2^c)^b$ sets, to be stored in the basic memory table 9 under assignment of different addresses of $2^b \times (2^c)^b$. Then, basic data of one set are interpolated to become $(2^{a-c})^b$ data in order to obtain $(2^c)^b \times (2^{1-c})^b$ data in total.

On the other hand, a set of coefficient data are formed by $2^b$ coefficient data which are required for calculation of a single interpolation data. The coefficient data are packed as $2^b(2^{a-c})^b$ data in total because there are $(2^{a-c})^b$ sets which are equal in number to interpolation data operated from a set of basic data, to be stored in the coefficient memory table 11 under assignment of different addresses of $2^b \times (2^{a-c})^b$.

In interpolation operation, the read addresses of the basic and coefficient memory tables 9 and 11 are generated by the binary counter 13 so that each set of basic data are read repeatedly by $(2^{a-c})^b$ times and different sets of coefficient data are correspondingly read with respect to the repeated respective sets, while the write addresses of the look-up table 1 are generated by the binary counter 13 so that different write addresses are sequentially designated for every reading of a set of basic and coefficient data.

(D) Calculating Time

Assuming that the look-up table 1 is a table having a b-dimensional address space formed by a-bit addresses per dimension and the basic memory table 9 is a table having a b-dimensional address space formed by c-bit addresses per dimension, $$\text{look-up table data number} = (2^a)^b \tag{8a}$$

$$\text{basic data number} = (2^c + 1)^b \tag{8b}$$

Assuming that L(i), B(j) and C(k) represent data of the look-up table 1 and the basic and coefficient memory tables 9 and 11 in the case that addresses thereof are i, j and k, respectively, L(i) can be obtained by the following expression, where $\alpha$ represents integers of 0 to $(2^b - 1)$.

$$L(i) = \overset{2^b}{\Sigma} \{B(j + \alpha) \times C(k + \alpha)\} \tag{9}$$

For obtaining a single data, $2^b$ multiplications and $(2^b - 1)$ additions are required in the case of performing the interpolation in a software manner, or $2^b$ accesses are required in a multiplier/accumulator, for example, in the case of performing the interpolation in a hardware manner. A floating point processor or the like is generally employed to perform fast operation in a software manner, whereas several seconds to several tens of seconds are required for single operation (addition, multiplication etc.) even if the same is employed. On the other hand, the access time of the multiplier/accumulator is extremely fast, e.g., several tens of nsec.

Consider, for example, a three-dimensional table having 4-bit addresses per dimension, to compare times required for obtaining data by three methods of:

(A) obtaining all data by calculation;

(B) obtaining basic data by calculation and performing interpolation in a software manner; and (C) obtaining basic data by calculation and performing interpolation in a hardware manner.

The data number is $(2^4)^3 = 4096$ from the expression (8a). The basic data number is $(2^1 + 1)^3 = 27$ or $(2^2 + 1)^3 = 125$ or $(2^3 + 1)^3 = 729$ from the expression (8b), and it is assumed to be 125 since errors are increased when the basic data number is excessively small. Further, the calculating time per data in the host computer 7 is assumed to be 1 msec., and the interpolation time per data is assumed to be 400 μsec. in software and 0.4 μsec. in hardware.

(A) In the case of calculating all data:

1 msec. × 4096 ≈ 4.1 sec.

(B) In the case of software interpolation:

1 msec. × 125 + 400 μsec. × 4096 ≈ 1.8 sec.

(C) In the case of hardware interpolation:

1 msec. × 125 + 0.4 μsec. × 4096 ≈ 0.13 sec.

It is obvious that the case of hardware interpolation is extremely faster as compared with other cases, and such tendency is remarkable as the calculation time per data and the data number are increased. No consideration is made on a time required for data transfer from the host computer 7 to the look-up table 1 and the basic memory table 9 in the above time approximation, since the time is generally extremely fast as several μsec. per data, and the transferred data number is small particularly in the case of interpolation.

(E) Practicability

On the assumption that the look-up table 1 is a table having a b-dimensional address space with a-bit addresses per dimension and the basic memory table 9 is a table having a b-dimensional address space with c-bit addresses per dimension, comparison is made on practicability with respect to:

(A) a method of simply incrementing the address of each table 1 by 1;

(B) a method of minimizing the basic and coefficient memory tables 9 and 11 in storage capacity; and (C) a method in accordance with the aforementioned embodiment of the present invention.

In the method (A), an address generator may be prepared by a binary counter of $a \times b \times 2^b$ bit output, whereas the basic and coefficient memory tables 9 and 11 respectively require $(2^a)^b \times 2^b$ in capacity, the capacity being $2^b$ times that of the look-up table 1, and hence this method is not practical.

In the method (B), the basic and coefficient memory tables 9 and 11 may be extremely compacted in capacity as $(2^c + 1)^b$ and $(2^{a-c})^b$ respectively, whereas the address generator is extremely complicated and hence this method is not also practical.

In the method (C), the address generator may be prepared by a binary counter of $a \times b \times 2^b$ bit output similarly to the method (A), and the basic and coefficient memory tables 9 and 11 are also considerably compacted in capacity as $(2^c)^b \times 2^b$ and $(2^{a-c})^b \times 2^b$ respectively, and hence this method is highly practical.

(F) Example of Modified Employment

In the aforementioned embodiments, results of color compensation operation etc. on all input image data are obtained from the look-up table.

However, the capacity of the look-up table becomes too large in practice, since $2^8 \times 3$ table addresses are necessary when eight bits are required for respective one of red (R), green (G) and blue (B) of color signals.

In order to overcome this, a well-known interpolation method may be utilized wherein a look-up table is formed for discrete input image data and data read from the same are interpolated to obtain all results of color compensation etc. In this case, data generated by the method of the present invention are written in the look-up table of the conventional interpolation system to be read from the look-up table to be subjected to interpolation operation in the conventional system so that results of color correction operation etc. with respect to $2^8 \times 3$ addresses for three color signals can be obtained, without the storage capacity of the look-up table being too large.

According to the present invention as hereinabove described, data to be written in a look-up table can be efficiently generated in a short time by adding a simple circuit, whereby colors of an output image displayed on a color monitor can be changed substantially in real time even if an operator changes an image processing condition in an electronic process scanner, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating look-up table data, comprising the steps of:
    previously operating on and storing basic data, obtained by thinning-out data to be written in a look-up table which is stored in a memory, at prescribed intervals;
    previously storing, in a coefficient memory table, coefficient data required for linearly interpolating said basic data;
    performing an interpolation operation in an interpolation computing element by reading said basic data and said coefficient data while relating the same with each other; and
    sequentially writing data obtained by said interpolation operation in said look-up table.

2. A method of generating look-up table data in accordance with claim 1, wherein
    said look-up table has a multi-dimensional address space having a plurality of bit addresses per dimension,
    said basic data are stored in a basic memory table having said multi-dimensional address space with a plurality of bit addresses per dimension,
    a number of said basic data is $2^c + 1$ per dimension and is $(2^c1)^b$ in total in b dimensions,
    where b is the number of dimensions in the address space,
    a is the number of bit addresses per dimension of said look-up table, and
    c is the number of bit addresses per dimension of said basic memory table,
    a, b and c being natural numbers,
    one set of said basic data are formed by $2^b$ of the basic data which mutually adjoin in each dimension, and said basic data are packed as $2^b \times (2^c)^b$ data with respect to $(2^c)^b$ sets to be stored in said basic memory table under assignment of different addresses, and
    said one set of the basic data are interpolated to become $(2^{a-c})^b$ data in order to obtain $(2^c)^b \times (2^{a-c})^b = (2^a)^b$ data in total.

3. A method of generating look-up table data in accordance with claim 2, wherein one set of said coefficient data are formed by $2^b$ of the coefficient data which are required for calculation of a single interpolation data, and said coefficient data are packed as $2^b \times (2^{a-c})^b$ data in $(2^{a-c})^b$ sets, $(2^{a-c})^b$ being equal to the number of interpolation data operated from a set of said basic data, said coefficient data stored in said coefficient memory table under assignment of different addresses.

4. A method of generating look-up table data in accordance with claim 3, wherein read addresses are designated so that each set of said basic data are read repeatedly by $(2^{a-c})^b$ times and different sets of said coefficient data are correspondingly read with respect to respective ones of said repeated sets respectively, and different write addresses are designated for every reading of a set of said basic and coefficient data, in reading of said basic and coefficient data and writing of obtained data in said look-up table.

5. A method in accordance with claim 4 wherein $1 \leq c < a$.

6. A method in accordance with claim 2 wherein $1 \leq c < a$.

7. A method in accordance with claim 3 wherein $1 \leq c < a$.

8. An apparatus for generating look-up table data, comprising:
a computer for operating on basic data, obtained by thinning-out data to be written in a look-up table which is stored in a memory, at prescribed intervals;
a basic memory table for storing said basic data in previously assigned addresses;
a coefficient memory table for storing, in previously assigned addresses in a coefficient memory table, coefficient data required for linearly interpolating said basic data;
an address generator for generating read addresses of said basic and coefficient memory tables and write addresses of said look-up table while correlating the same with each other; and
an interpolation computing element for receiving said basic and coefficient data read along said read addresses to perform an interpolation operation, data obtained by said interpolation operation being written in said look-up table in accordance with said write addresses.

9. An apparatus for generating look-up table data in accordance with claim 8, wherein
said look-up table is a table having a multi-dimensional address space with a plurality of bit addresses per dimension,
said basic memory table is a table having said multi-dimensional address space with a plurality of bit addresses per dimension,
a number of said basic data is $2^c + 1$ per dimension and is $(2^c + 1)^b$ in total b dimensions,
where b is the number of dimensions in the address space,
a is the number of bit addresses per dimension of said look-up table, and
c is the number of bit addresses per dimension of said basic memory table,
a, b and c being natural numbers,
one set of said basic data are formed by $2^b$ of the basic data which mutually adjoin in each dimension, and said basic data are packed as $2^b \times (2^c)^b$ data with respect to $(2^c)^b$ sets to be stored in said basic memory table under assignment of different addresses, and
said one set of the basic data are interpolated to become $(2^{a-c})^b$ data in order to obtain $(2^c)^b \times (2^{a-c})^b = (2^a)^b$ data in total.

10. An apparatus for generating look-up table data in accordance with claim 9, wherein one set of said coefficient data are formed by $2^b$ of the coefficient data which are required for calculation of a single interpolation data, and said coefficient data are packed as $2^b \times (2^{a-c})^b$ data with respect to $(2^{a-c})^b$ sets which are equal to in number interpolation data operated from a set of said basic data, to be stored in said coefficient memory table under assignment of different addresses.

11. An apparatus for generating look-up table data in accordance with claim 10, wherein designation of read addresses is performed so that a set of said basic data are read repeatedly by $(2^{a-c})^b$ times and different sets of said coefficient data are correspondingly read for respective ones of said repeated sets, and designation of different write addresses is performed for every designation of read addresses of a set of said basic and coefficient data, in generation of read addresses of said basic and coefficient memory tables and write addresses of said look-up table by said address generator.

12. An apparatus for generating look-up table data in accordance with claim 11, wherein said address generator is prepared by a binary counter of a prescribed digit number to perform required address designation by prescribed combination of respective digit outputs.

13. An apparatus for generating look-up table data in accordance with claim 12, wherein said interpolation computing element is prepared by a multiplier/accumulator, and a control signal is supplied by said binary counter so that a content of accumulation of the multiplier/accumulator is cleared for each designation of read addresses of a set of said basic and coefficient data.

14. An apparatus in accordance with claim 13 wherein $1 \leq c < a$.

15. An apparatus in accordance with claim 9 wherein $1 \leq c < a$.

16. An apparatus in accordance with claim 10 wherein $1 \leq c < a$.

17. An apparatus in accordance with claim 11 wherein $1 \leq c < a$.

18. An apparatus in accordance with claim 12 wherein $1 \leq c < a$.

* * * * *